April 15, 1930.  F. R. KLAUS  1,754,631
WHEEL MOUNTING
Filed March 23, 1927  3 Sheets-Sheet 1

INVENTOR
Fred R. Klaus.
BY
ATTORNEY

April 15, 1930.  F. R. KLAUS  1,754,631
WHEEL MOUNTING
Filed March 23, 1927  3 Sheets-Sheet 3

INVENTOR
Fred R. Klaus.
BY
ATTORNEY

Patented Apr. 15, 1930

1,754,631

UNITED STATES PATENT OFFICE

FRED R. KLAUS, OF WARREN, OHIO, ASSIGNOR TO GOODYEAR TIRE & RUBBER COMPANY, OF AKRON, OHIO, A CORPORATION OF OHIO

WHEEL MOUNTING

Application filed March 23, 1927. Serial No. 177,647.

This invention relates to vehicle wheel structures and more particularly to an improved adaptor ring for mounting the outer rim assembly on an improved wheel structure of the dual tire carrying type.

The principal object of the invention is to provide a combined adaptor and wedge ring for securing a vehicle rim in place embodying a minimum number of loose parts that will adequately support a rim assembly on a wheel structure of the character shown. Although this invention is primarily directed to dual wheel construction, the proposed form of adaptor ring may also be used with other wheel structures wherein one or more tire carrying rims are mounted on a single wheel structure.

Figure 1:
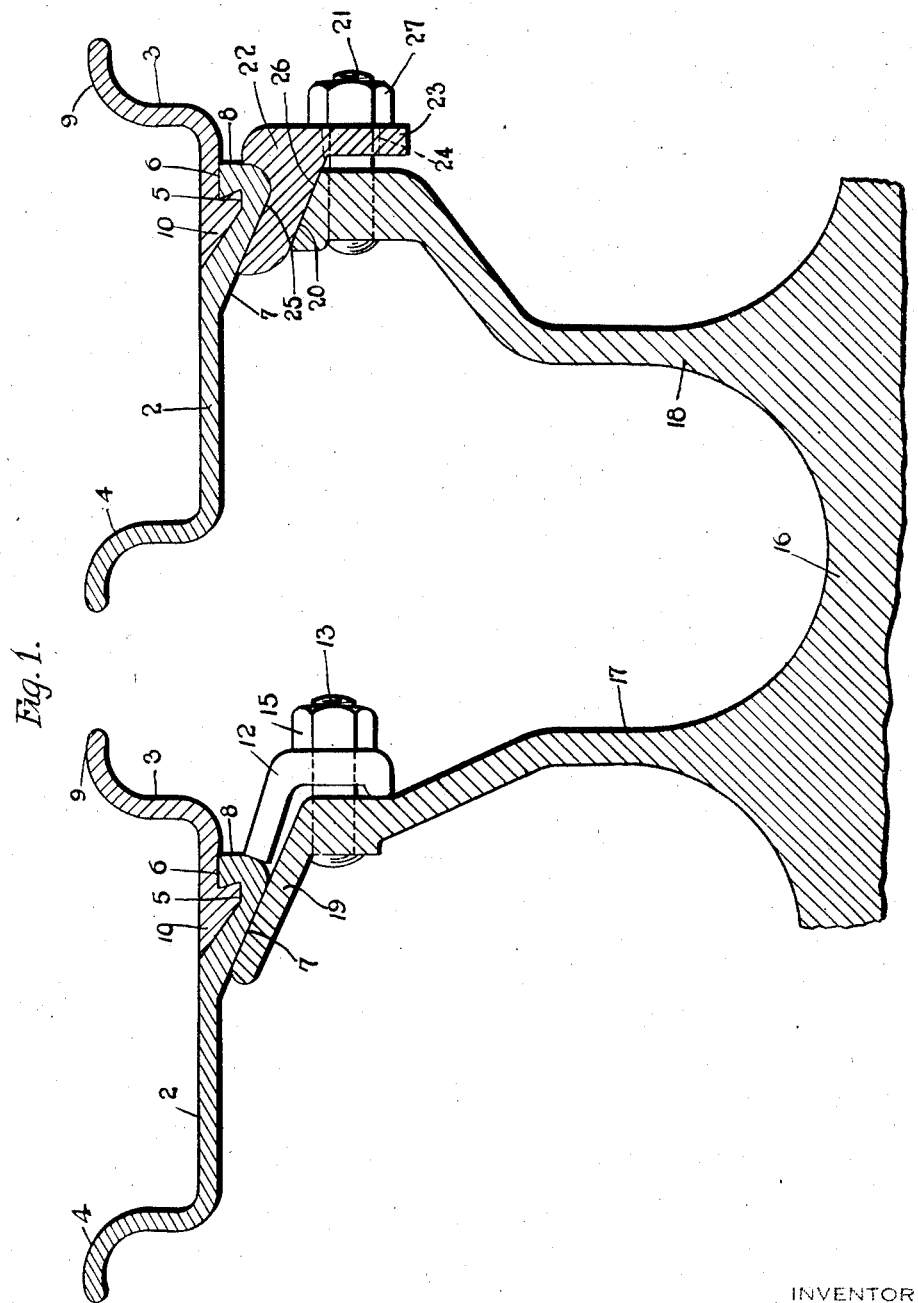

Fig. 1 of the accompanying drawing is a transverse sectional view of a dual wheel structure and rim assembly embodying this invention;.

Figure 2:
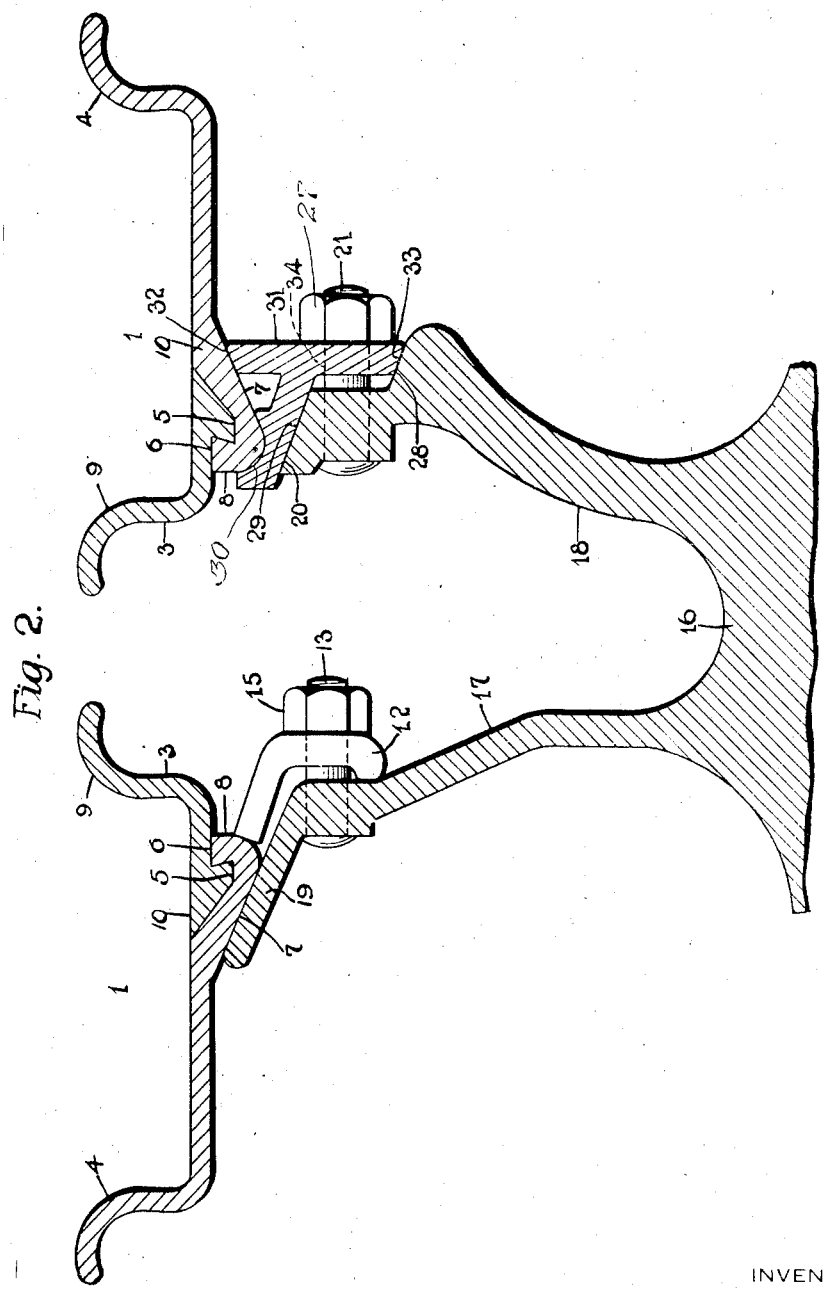
Figure 3:
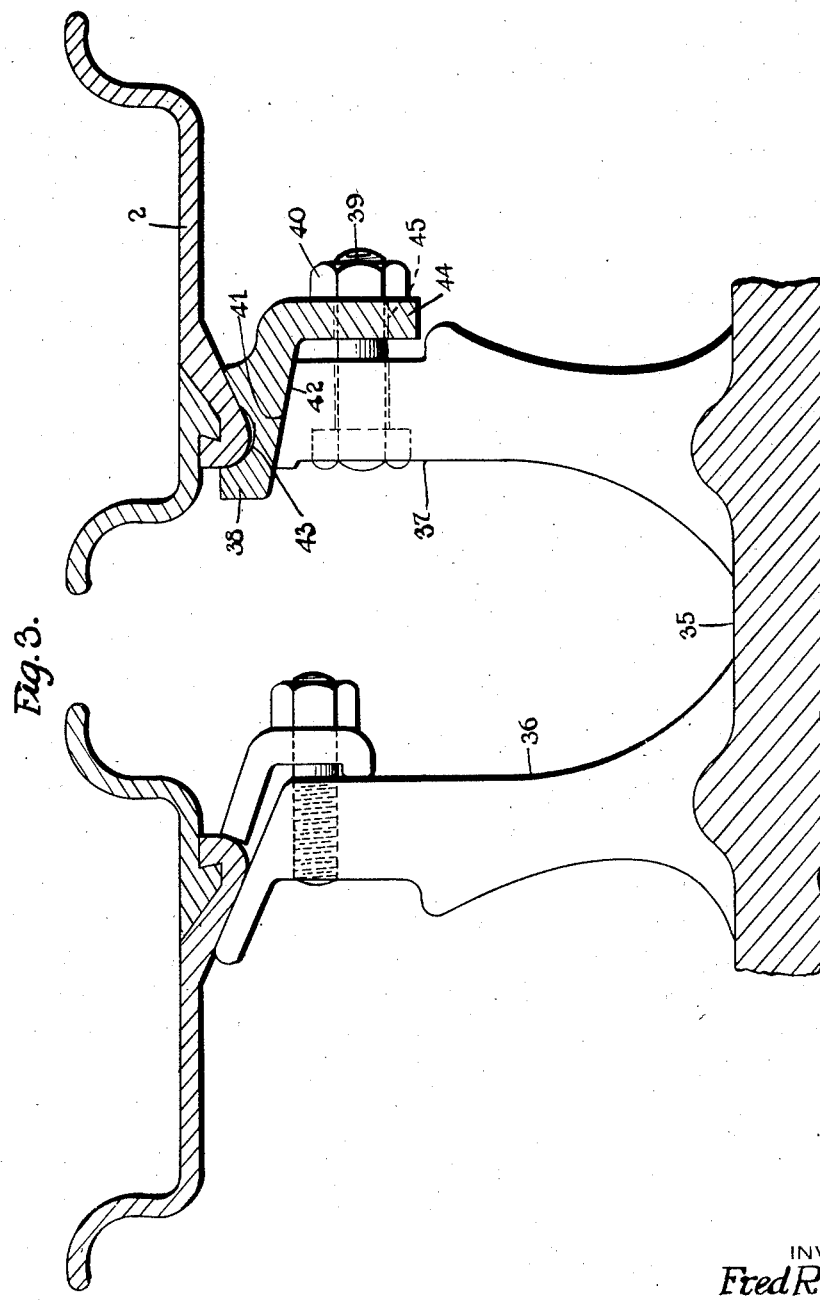

Fig. 2 is a corresponding transverse sectional view of a wheel assembly illustrating a modified adaptation of this invention wherein the rims are mounted on the wheel structure in opposed relation; and Fig. 3 is a transverse sectional view of a modified form of adaptor ring and wheel structure embodying the invention.

A preferred form of pneumatic tire-carrying rim 1 is shown in connection with each of the adaptations of this invention. Each tire-carrying rim preferably comprises a pair of interlocking annular members 2 and 3, the first of which is transversely split and the other endless in order that the rim parts may be quickly and easily assembled or disassembled. The annular base member 2 is transversely split and provided with a tire retaining flange 4 that is formed along one edge portion and an outwardly open depressed annular channel 5 that is formed in its other edge portion. The outer wall of the annular channel 5 terminates in an upstanding annular seating shoulder 6. The side walls of the channel 5 are preferably inclined at an oblique angle. The inner face of the channelled portion of the base member 2 has an inclined inner seating face 7 that constitutes the rim seat and that is arranged to engage a complementary portion of the wheel or adaptor ring structure. The lateral outer face of the channel side wall 8 provides an annular shoulder that is adapted to be engaged by suitable rim clamps 12 for clamping the rim in position on the wheel structure.

The endless side ring 3 of the rim structure comprises an outwardly extending tire retaining flange 9 that is formed along its outer marginal portion and an inwardly extending flange or interlocking tongue 10 that is adapted to interfit with the channel 5 of the base member 2 to maintain the rim parts in assembled relation.

The wheel structure shown in Fig. 1 and Fig. 2 of the accompanying drawing comprises a body portion 16 that has a pair of spaced outwardly extending disc elements 17 and 18 that are adapted to support a pair of tire receiving rims 1 in spaced relation. The inner disc 17, which is closer to the vehicle upon which the wheel is mounted than the disc 18, has an inclined annular rim seating flange 19 formed in its outer marginal portion that is complemental to the inclined rim seating face 7 of the rim 1 that is mounted thereon. The transverse clamping bolts 13, a plurality of which are securely mounted in the disc 17 adjacent its periphery, are preferably threaded into suitable holes formed in the disc having their secured end portions suitably riveted over to permanently secure them in place. Clamping nuts 15 force the clamps 12 against the rim shoulder 8 to securely hold the rim in place.

The outer rim supporting disc 18 has a correspondingly inclined annular rim seating face 20. This rim seating face is inclined in the same general direction as the flange 19 and preferably to substantially the same degree. A plurality of uniformly spaced clamping lugs or bolts 21 are preferably threaded into the disc 18 near its periphery and permanently secured in place by riveting over the inner ends of the lugs in conventional manner.

A transversely split annular adaptor ring 22 that constitutes the principal subject matter of the invention has a depending annular flange or a plurality of securing lugs 23 formed on one edge portion. A series of bolt receiving apertures 24 are formed in the flanged portion 23 of the adaptor ring. The radially outer face of the adaptor ring is provided with a peripheral rim seat 25 and its inner face has a tapered seat 26 that registers with the peripheral seat 20 of the wheel disc 18. The annular rim seat 25 substantially constitutes a saddle for receiving and laterally interlocking with the inner face of the channelled portion of the rim.

The supporting seat 20 of the wheel structure directly underlies the supporting seat 7 of the rim structure, thereby providing very rigid and secure rim mounting. The inclined seating face of the wheel structure acts against the adaptor ring to expand the adaptor ring to secure seating relation with the rim assembly. The tightening of the clamping nuts 27 forces the adaptor ring laterally on the tapered seat to securely wedge the parts together.

The mounting of the rim on a wheel structure is performed by contracting the adaptor ring until it snaps over the channel forming portion of the rim base to thereby interlock the adaptor ring with the rim assembly. The rim and adaptor ring are then mounted on the wheel with the face 26 of the adaptor ring in engagement with the inclined seat 20 of the wheel structure. In this position, the lugs 21 of the wheel extend through the apertures 24 of the adaptor ring. Tightening the wedging nuts 27 draws the conical seating faces of the wheel structure and the adaptor ring into rigid engagement and automatically aligns the rim and wheel structure and rigidly secures them together.

After the adaptor ring 22 is snapped into place within the tire carrying rim, the two elements may then be handled as a single unit. The inherent resiliency of the adaptor ring securely maintains it in place within the rim ready for application to the wheel structure as a unitary assembly. This relation of the parts greatly facilitates the original mounting and the changing of tires. There are no separate clamps or wedge ring parts to handle. This relation is also true of the other forms of interlocking adaptor rings hereinafter described.

Fig. 2 of the drawings shows an adaptor ring of somewhat modified form for supporting the outer rim in opposed relation with respect to the inner rim of the wheel structure. The portions of the wheel structure shown in Fig. 2 that provide the mounting for the inner rim and the rim assemblies are substantially identical in each figure and the parts thereof are therefore correspondingly numbered. The mounting for the outer rim assembly and the adaptor ring are preferably somewhat different from the structure of Fig. 1 although the difference is not essential since the mere reversal of the rim seat of Fig. 1 provides an excellent opposed mounting for rims of dual tire wheel structure.

The wheel structure shown in Fig. 2 is substantially the same as the structure shown in Fig. 1 except that it has an outwardly extending annular shoulder 28 formed adjacent its periphery for seating a portion of the adaptor ring. The seat 28 is tapered to substantially the same degree as the adjacent peripheral seat 20.

The adaptor ring shown in Fig. 2 is transversely split and is provided with an internal seating face 29 that registers with the peripheral seat 20 of the wheel structure and an outer seat or saddle 30 that is adapted to receive the depressed channel-forming portion of the rim element 2. An annular flange portion 31 of the adaptor ring has a peripheral seat 32 which is adapted to support the overlying tire receiving rim and an internal tapered seat 33 that directly underlies the seat 32 and engages the tapered seat 28 of the wheel. This provides a very secure and light weight rim mounting particularly for dual wheel structures having the rims supported in opposed relation. The flange 31 also has a plurality of transverse bolt-receiving apertures 34 formed therein for receiving the clamping lugs or bolts 21. The clamping nuts 27 serve to secure the adaptor ring and the associated rim to the wheel structure. The flange 31 may either continuously seat on the shoulder 28, or the bolt-receiving portions of the flange may be inwardly extending lugs that respectively seat on the shoulder 28.

Fig. 3 of the drawings shows an application of the invention to a modified form of wheel structure. In this application of the invention the wheel embodies a hub portion 35 from which radiate a series of spokes 36 upon which the inner rim 1 is mounted in substantially the same manner as previously described and a second series of spokes 37 that carry a modified form of adaptor ring 38 on their extremities. The rim clamping mechanism carried by the series of spokes 36 is substantially the same as the corresponding clamping equipment described in connection with Fig. 1 and Fig. 2 and is correspondingly numbered.

Each of the second series of spokes 37 has a transverse clamping lug or bolt 39 at its outer end and a suitable cooperating clamping nut 40 carried thereby. The inclined peripheral face 41 of the series of spokes constitutes the supporting face for engaging the inclined inner seating face 42 of the adaptor ring 38. The adaptor ring 38 also has a rim supporting saddle 43 formed in its outer surface that is adapted to receive and laterally interlock with the channeled portion of the rim base 2. The adaptor ring 38 also has an inwardly extending flange 44 that is provided with a series of apertures 45 for receiving the clamping lugs 39 by means of which the adaptor ring is secured to the respective spokes 37.

The adaptor ring shown in Fig. 3 is substantially the same as the adaptor ring of Fig. 1 except that the saddle for receiving the rim element is reversed in order that the rims may be arranged in opposed relation. The manipulation of the adaptor ring shown in Fig. 3 in the mounting and dismounting of the tire carrying rim on the wheel structure is substantially the same as heretofore described in connection with the adaptor rings shown in Fig. 1 and Fig. 2.

The particular advantages of an adaptor ring of this general character reside in the simplicity of the structure, its light weight and the small number of removable parts associated therewith. In each instance at least a portion of the rim supporting seat of the adaptor ring directly overlies the peripheral seat formed on the wheel structure. This provides a very rigid and secure mounting for a rim of the character described. This form of adaptor ring could obviously be so constructed as to receive various other forms of tire rims by changing the form of the rim supporting seat.

The adaptor ring in each instance is mounted in place in substantially the same manner as the corresponding ring shown in Fig. 1. The adaptor ring is first interlocked with the rim assembly after which these parts may be handled as a unit. The assembled rim and adaptor ring are then mounted on the tapered rim seat. The clamping nuts 27 or 40 as the case may be which produce a wedging action between the wheel structure and the rim assembly, are tightened to rigidly secure the parts together.

Particular attention is also invited to the lateral interlocking of the adaptor ring and the rim which holds these parts in defined relation during the clamping operation. There is no relative movement of the rim and the adaptor ring during the mounting operation as in other structures. The many operational advantages of such structures will be apparent to those skilled in the art.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A vehicle wheel structure comprising a wheel body having a conical supporting face, an adjacent conical shoulder, a split adaptor ring having an internal bearing face adapted to register with said conical supporting face, a second internal bearing face adapted to register with and seat upon said conical shoulder, an external rim supporting saddle directly overlying said first conical supporting face, an external rim supporting face laterally removed from said saddle and directly overlying said conical shoulder, and means adapted to force said adaptor ring laterally across said supporting face and said conical shoulder to positively expand said ring to interlocking relation with said rim.

2. A vehicle wheel structure comprising a tire-receiving rim having an internal annular seating face formed thereon, a split adaptor ring having a felloe engaging seat on its inner side and an external annular seat at least partially overlying said felloe engaging seat and adapted to laterally interlock with the seating face formed on said rim to positively position said rim laterally relative to said adaptor ring, said rim and said adaptor ring being adapted to be separately assembled to provide a demountable unitary structure.

3. A vehicle wheel structure comprising a wheel body having a conical supporting face, an adjacent shoulder, a split adaptor ring having an internal bearing face for registering with said conical supporting face, a second internal bearing face for registering with said shoulder, an external rim supporting saddle directly overlying said first conical supporting face, an external rim supporting face laterally removed from said saddle and directly overlying said shoulder, and means for forcing said adaptor ring laterally across said supporting face and said shoulder to expand positively said ring into interlocking relation with said rim.

In witness whereof, I have hereunto signed my name.

FRED R. KLAUS.